(12) United States Patent
Habraken (10) Patent No.: US 8,070,061 B2
(45) Date of Patent: Dec. 6, 2011

(54) CARD CREDENTIAL METHOD AND SYSTEM

(76) Inventor: G. Wouter Habraken, Austin, TX (US)

( * ) Notice: Subject to any disclaimer, the term of this patent is extended or adjusted under 35 U.S.C. 154(b) by 351 days.

(21) Appl. No.: 12/255,438

(22) Filed: Oct. 21, 2008

(65) Prior Publication Data

US 2010/0096452 A1 Apr. 22, 2010

(51) Int. Cl.
*G06K 5/00* (2006.01)
(52) U.S. Cl. .......................... 235/382; 235/375; 235/380
(58) Field of Classification Search .................. 235/382, 235/375, 380, 384; 380/23, 24
See application file for complete search history.

(56) References Cited

U.S. PATENT DOCUMENTS

| | | | |
|---|---|---|---|
| 5,120,939 A * | 6/1992 | Claus et al. | 235/382 |
| 5,420,924 A * | 5/1995 | Berson et al. | 713/186 |
| 5,434,919 A | 7/1995 | Chaum | 380/30 |
| 6,434,238 B1 | 8/2002 | Chaum et al. | 380/45 |
| 6,718,314 B2 | 4/2004 | Chaum et al. | 705/64 |
| 2002/0008145 A1* | 1/2002 | Walsh et al. | 235/462.46 |
| 2002/0062438 A1* | 5/2002 | Asay et al. | 713/157 |
| 2005/0033703 A1* | 2/2005 | Holdsworth | 705/67 |
| 2008/0148393 A1* | 6/2008 | Wendt | 726/19 |

OTHER PUBLICATIONS

R. L. Rivest, A. Shamir, and L. Adleman, "A Method for Obtaining Digital Signatures and Public-Key Cryptosystems," *Communications of the ACM*, vol. 21, No. 2 (downloaded from http://people.csail.mit.edu/rivest/publications.html), pp. 120-126, Feb. 1978.

Steven M. Bellovin, "A Introduction to Modern Cryptography," presentation (downloaded from http://www.research.att.com/~smb), pp. 1-31, Mar. 1, 2003.
Gerhard P. Hancke, "A Practical Relay Attack on ISO 14443 Proximity Cards," manuscript (downloaded from http://www.cl.cam.ac.uk/~gh275/), pp. 1-13, Feb. 2005.
Ziroli Plutschow, "Security and Privacy Aspects of Low-Cost Radio Frequency Identification Systems," presentation (downloaded from http://www.crypto.ethz.ch/teaching/lectures/ISS05/), 75 pages, Dec. 12, 2005.
Joint Interpretation Library, "Application of Attack Potential to Smartcards," Version 2.1, pp. 1-34, Apr. 2006.
Eurosmart, "RFID technology security concerns: Understanding Secure Contactless device versus RFID tag," manuscript (downloaded Aug. 27, 2008 from http://www.eurosmart.com/Update/07-10/Eurosmart_White_paper_on_RFID_Oct07.pdf), pp. 1-9, 2007.
TechEncyclopedia, "Challenge/Response," web page downloaded Jul. 11, 2008 from http://www.techweb.com/encyclopedia/shared/ArticlePageSrc.jhtml?term=challenge/response, pp. 1-2.
Wikipedia, "CRAM-MD5," web page downloaded Jul. 11, 2008 from http://en.wikipedia.org/wiki/CRAM-MD5, pp. 1-2.

(Continued)

*Primary Examiner* — Daniel Hess
*Assistant Examiner* — Tabitha Chedekel
(74) *Attorney, Agent, or Firm* — Campbell Stephenson LLP (57) ABSTRACT

In one implementation, a method for providing access to a secure facility includes authenticating the user; generating a card credential, transmitting the card credential to an access card carried by of the user, and transmitting the card key to the access card in a form that is usable by the access card. The generating the card credential includes encrypting the card key using a server encryption key. The card key is usable for a challenge-response interaction during subsequent access requests by the user.

30 Claims, 7 Drawing Sheets

OTHER PUBLICATIONS

Wikipedia, "SHA hash functions," web page downloaded Jul. 11, 2008 from http://en.wikipedia.org/wiki/SHA_hash_functions, pp. 1-8.

Neuman, Clifford B., et al., "A Note on the Use of Timestamps as Nonces," *Operating Systems Review*, vol. 27, No. 2, pp. 10-14, Apr. 27, 1993.

Menezes, A., et al., "Chapter 12: Key Establishment Protocols," *Handbook of Applied Cryptography*, CRC Press, Boca Raton, FL, pp. 489-541, 1997.

Clark, John, et al., "A Survey of Authentication Protocol Literature: Version 1.0," pp. 1-109, Nov. 17, 1997.

Rankl, W., et al., "Handbuch der Chipkarten, 4.Auflage, Kap. 10.3, 10.4 Lebenszyklus einer Chipkarte," Handbuch Der Chipkarten, pp. 638-656, Aug. 29, 2002.

Fan, Chun-I, et al., "Robust remote authentication scheme with smart cards," *Computers & Security*, vol. 24, pp. 619-628, 2005.

International Search Report for International Patent Application No. PCT/US2009/061567. 5 pages, Apr. 9, 2010.

\* cited by examiner

CARD CREDENTIAL METHOD AND SYSTEM

BACKGROUND OF THE INVENTION

1. Field of the Invention

The present invention relates to secure access techniques, and more particularly to authentication using access cards.

2. Description of the Related Art

Physical access cards are often used as a security measure for preventing access by unauthorized personnel to a secure area such as an office suite. A simple form of a physical access card is an access card with a magnetic stripe that stores a digital password. When a user approaches a locked door and presents the access card to a card reader, the card reader reads the password from the magnetic stripe. The card reader may communicate with a central server to confirm the password, and/or to check if the user is listed in an approved access control list. The central server can then unlock a door for the user.

One weakness of this simple system is that if the password from the magnetic-stripe can be read and reproduced by a malicious party, then the malicious party may be able to use the password to gain unauthorized access. One approach for strengthening the security measures is to use access cards that are "smart" cards, with a built-in processor and memory. A password, or key, is stored into the memory in such a manner that it can be read by the built-in processor, but cannot be read by a malicious party.

When a smart card is used to gain access to a secure area, the smart card can respond in real time to a "challenge" received from a card reader. The card reader typically uses random numbers to generate challenges that are unique: the challenges include data that are different from one access attempt to another. The smart card performs a calculation using its internally stored key and the data received from the card reader, and transmits a response, based on that calculation, back to the card reader. The card reader examines the response to confirm that the smart card possesses the correct key. Access is granted only if the smart card returns an acceptable response to the challenge sent by the card reader. This challenge-response interaction protects the key on the smart card: the key itself is not transmitted as part of the communications between the smart card and the card reader.

Such smart cards are generally more difficult to reproduce or simulate than a magnetic-stripe card. One of the concerns in such smart card authorization systems is that a malicious party may be able to deduce the internal key or otherwise "break" the cryptographic features in the calculations performed by the smart-card, and thereby provide acceptable responses to challenges from card readers. One approach to avoiding such attacks is to increase the sophistication of the challenge-response calculations performed by the smart-card. Such an approach generally imposes some additional cost, such as an increased processing power for the smart card. System designers, therefore, must generally make trade-offs between various costs and cryptographic security.

SUMMARY

In one implementation, a method for enabling a user to access a secure facility includes authenticating that the user is indeed an acceptable person (or entity) to have the access, generating a card credential, transmitting the card credential to an access card in the possession of the user, and transmitting the card key to the access card in a form that is usable by the access card. The generating the card credential includes encrypting the card key using a server encryption key. The card key is usable for a challenge-response interaction during subsequent access requests by the user.

The card credential can be used to authenticate the access card, by checking the validity of a challenge-response interaction. Thus, in some implementations, the method can further include receiving a request for authentication that includes the card credential and a candidate response, and obtaining the card key from the card credential using a server decryption key. The candidate response can be a response that was provided by the access card during a challenge-response interaction as part of an access request by the user. The method can additionally include generating a response data based on at least the card key, a challenge data, and a card authentication protocol; comparing the candidate response to the response data; and generating an authentication output based at least on the comparing.

In various implementations, the generating the card credential is performed by a first server computer as part of an enrollment procedure following the authentication of the user, and the receiving the request for authentication is performed by a second server computer (which can be different from the first server computer, and possibly disconnected form the first server computer) following the access request by the user.

In yet another implementation, a method includes receiving a request for authentication, including a card credential and a candidate response; decrypting at least a portion of the card credential using a server decryption key to recover a card key; generating a response data based on at least the card key, a challenge data that was provided to an access card during a challenge-response interaction, and a card authentication protocol; comparing the candidate response to the response data; and generating an authentication output based at least on the comparing.

BRIEF DESCRIPTION OF THE DRAWINGS

A more complete understanding of the present invention and advantages thereof can be acquired by referring to the following description and the accompanying drawings, in which like reference numbers indicate like features.

FIG. 8 shows an example of details of some of the operations shown in FIG. 7.

DETAILED DESCRIPTION

Described herein are tools and techniques for authenticating an access card used for access to a secure facility. In various implementations these tools and techniques can be used to control physical access to offices, office suites, buildings, data centers, or other secure areas. Alternatively, or in addition, these tools and techniques can data access to computer systems, databases, or other secure computing equipment or information. Similarly, these tools and techniques can be applied to control financial access to deposit accounts, credit accounts, or other financial resources.

In some implementations, these tools and techniques can interweave two different cryptographic techniques, so that a computationally less-intensive protocol is performed on an access-card processor, and is linked with a computationally more-intensive protocol that is performed on a secure server. In some implementations, the less-intensive protocol can be used on access cards during a contactless interaction with a card reader. In some implementations, the less-intensive protocol is a symmetric encryption protocol, and the more-intensive protocol is a public-key protocol.

It is contemplated that in some implementations these tools and techniques can use two linked cryptographic protocols; one cryptographic protocol is executed on an access card using keys with relatively short life cycles, and the other cryptographic protocol is executed on a secure server using keys with relatively longer life cycles.

In some implementations, these tools and techniques provide a stateless security system that enables secure access without needing to consult a centralized access control list at the time that access needs to be granted.

In some implementations, these tools and techniques enable administrators to upgrade the security of some users, without necessitating a wholesale replacement of access cards for all users. In some implementations, these tools and techniques enable administrators to upgrade the security of some secure areas, without necessitating a wholesale replacement of card readers for all the secure areas in an organization.

Figure 1:
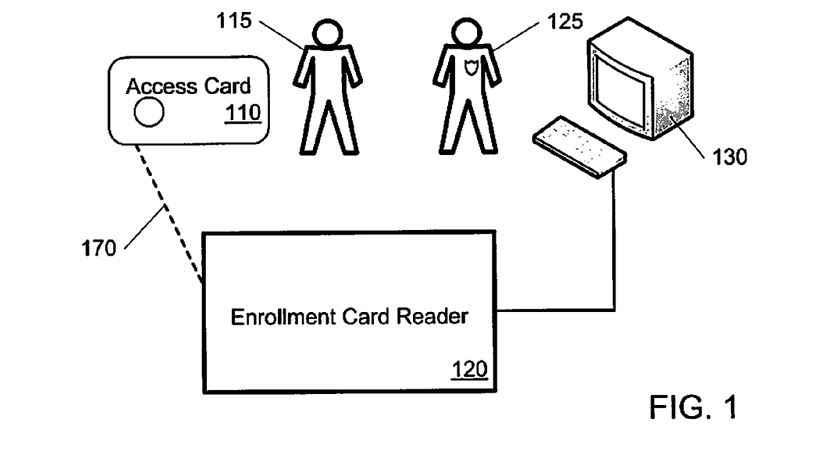
FIG. 1 shows an example of an environment in which a user enrolls an access card.

FIG. 1 shows an example of an environment in which a user 115 enrolls an access card 110. An "out-of-band" authentication process is employed to establish that user 115 is a legitimate user, authorized to gain access to an organization's secure area. This out-of-band authentication is some technique by which a gate-keeping administrator 125 of the secure area confirms that user 115 is a person to be trusted with the access to the secure area. In various implementations, the access card enrollment is not completed unless user 115 passes the out-of-band authentication.

In the depicted example, administrator 125 is a security guard at an organization's front security desk. The security guard recognizes user 115 by sight as a trusted member of the organization. Other measures can be used instead of, or in addition to, this simple recognition. User 115 may need to provide a photo identification or a biometric identification (fingerprint, voice recognition, retinal scan); speak, write, or type a password or personal identification number (PIN) code; or respond to interview questions, or other measures, or some combination thereof. Similarly, the security guard or other administrator can consult a database to confirm that the user's information matches the organization's records, and that the user is indeed approved for access to the secure area.

After the out-of-band authentication has been successfully completed, the user's access card 110 is provided with a digital credential. The credential, discussed below, is generated by a trusted server 130, and is communicated over a data network or other communications link to a card reader 120 that is located within convenient range of the user. Card reader 120 loads the credential onto access card 110 through a wireless link 170, which uses radio waves to transmit the credential to access card 110. For example, wireless link 170 can use the ISO/IEC 14443 standard and a 13.56 MHz frequency. In other implementations, an access card can receive the credential and otherwise communicate through a contact interface. For example, the card reader and access card can be equipped with contact interfaces that use the ISO 7816 smart card standard. User 115 then carries the access card, loaded with the credential, as a proof that user 115 has undergone the out-of-band authentication.

Figure 2:
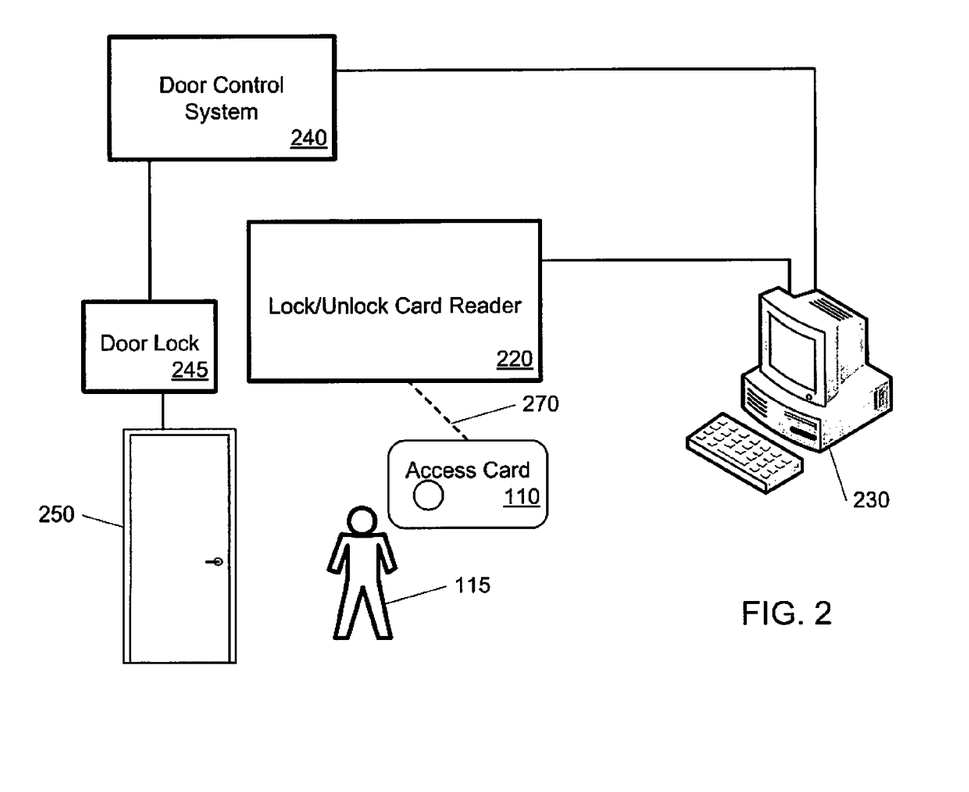
FIG. 2 shows an example of an environment in which the access card is used with a card reader to gain access to a secure area.

FIG. 2 shows an example of an environment in which access card 110 is used with a card reader 220 to gain access to a secure area. A door 250 provides entry to the secure area, and remains locked unless opened by a signal from a door controller system 240 to a door lock 245. Door 250 is typically located at a different location than the card enrollment of FIG. 1. For example, enrollment can be performed at the front security desk of an organization's building. Door 250 can be located in a different section or on a different floor of the building, or even in a different location altogether, such as a different building or a different city.

In this example, user 115 uses access card 110 to request that door 250 be unlocked. User 115 holds access card 110 in close proximity to card reader 220, which is typically mounted near door 250. Card reader 220 communicates with access card 110 through a wireless link 270 or a contact interface. Card reader 220 performs a challenge-response interaction with access card 110, and receives the credential from access card 110. Card reader 220 communicates the credential and information about the challenge-response interaction to a trusted server 230. Trusted server 230 can be the same as or different from trusted server 130 from FIG. 1. Trusted server 230 analyzes the credential and the information about the challenge-response interaction. Based on this analysis, trusted server 230 determines whether access card 110 has indeed undergone the enrollment process from FIG. 1.

If trusted server 230 determines that access should be granted, an appropriate signal is sent from trusted server 230 to door controller system 240, which then signals door lock 245. Door lock 245 then unlocks door 250 for user 115. Trusted server 230 can also communicate an appropriate signal back to card reader 220, which flashes a green light and/or emits a tone or otherwise indicates that access has been approved. If trusted server 230 determines that access should not be granted, trusted server 230 can communicate a different signal back to card reader 220, which can then flash a red light and/or emit a tone or otherwise indicate that access has been denied. Trusted server 230 can also log the failed access attempt by user 115, and can alert security personnel after an excessive number (one or more) of failed access attempts.

The above introduction includes two acts of "authentication." The out-of-band authentication (FIG. 1) is an authentication of the user. This first authentication verifies that the user is indeed a person who can access a secure facility. This first authentication must be successfully completed by a user in order to enroll the user's access card. After enrollment, the user can request access to the secure facility (FIG. 2) using the enrolled access card. The decision whether to grant or deny access involves electronic authentication of the access card. This second authentication verifies that the request comes from an access card that has indeed been enrolled.

Figure 3:
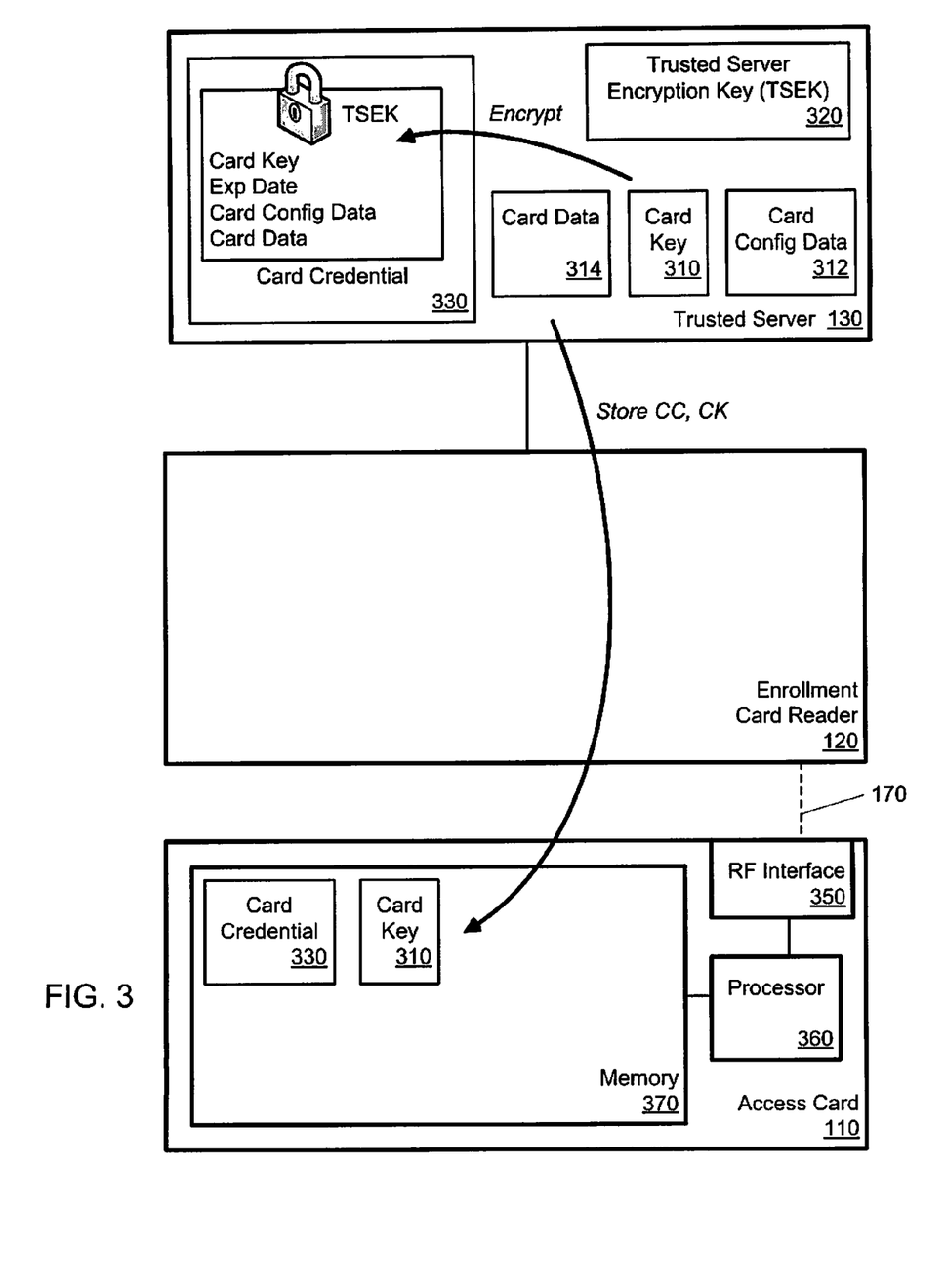
FIG. 3 shows an example of information flow during the enrollment operations from FIG. 1.

FIG. 3 shows an example of information flow during the enrollment operations from FIG. 1. This figure shows trusted server 130, card reader 120, and access card 110 from FIG. 1. Access card 110 includes circuitry for a non-contact interface 350, a processor 360, and a memory 370. Non-contact interface 350 enables communication with card reader 120 through wireless link 170. In some implementations, non-contact interface 350 is a radio-frequency (RF) interface, and communicates with corresponding circuitry (not shown) in card reader 120 using electromagnetic waves.

Processor 360 is coupled to non-contact interface 350 and to memory 370. In various implementations, processor 360 and other circuitry in access card 110 are powered by electromagnetic waves received from card readers such as card reader 120. The power circuitry (not shown) can be included within or separate from non-contact interface 350. In some implementations, the power circuitry uses inductive coupling and rectification to receive a particular frequency or frequencies of electromagnetic energy from card reader 120. Alternatively, or in addition, the power circuitry obtains power from an off-card supply through a contact interface.

After administrator 125 from FIG. 1 has completed the out-of-band authentication for user 115, administrator 125 uses trusted server 130 and card reader 120 to load information onto the user's access card 110. Trusted server 130 generates a card key 310 for access card 110. Card key 310 is a set of data, and can be generated, for example, using a cryptographic key generation processes. In alternate implementations, trusted server 130 receives card key 310 from a key source (not shown) using appropriate key distribution procedures. In the illustrated example, card key 310 is unique to the particular key card 110, and/or to the particular user 115. In alternate implementations, each card key is shared among several key cards and/or among several users.

Trusted server 130 encrypts card key 310 using a trusted server encryption key (TSEK) 320. In various implementations, TSEK 320 is a relatively strong encryption key having a substantially large number of bits and is protected by relatively strong security practices. TSEK 320 is generally not the same as card key 310. For example, TSEK 320 can be accessible only to a limited number of trusted personnel within an organization. In various implementations, TSEK 320 can be a 1024-bit, 2048-bit, 4096-bit, or other-size public key from a public-private key pair. The encryption of card key 310 can correspondingly be performed using a public-key encryption (e.g., using Digital Signature Standard (DSS), elliptic curve, or RSA algorithms, or others). In various alternate implementations, TSEK 320 can be an 80-bit, 112-bit, 168-bit, or 256-bit, or other-size symmetric key. The encryption of card key 310 can correspondingly be performed using a symmetric-key encryption (e.g., using Data Encryption Standard (DES), Triple DES (3DES), Advanced Encryption Standard (AES), Blowfish, Twofish, or Elliptic Curve Cryptography (ECC) procedures, or others).

Trusted server 130 generates a card credential 330 that includes the encrypted card key. Other information can also be included in the card credential, such as the life cycle of card key 310 (e.g., a lifetime, or expiration time and date, that causes the card key to be obsolete and unusable after a particular duration or point in time), card configuration data 312, and card data 314. In various implementations, these data 312 and 314 include information that is obtained from access card 110, or entered by administrator 125, or received from an access control list, or generated by trusted server 130, or combinations thereof.

Card configuration data 312 includes a description of access card 110. For example, different types of access cards are capable of performing different types of "on-card authentication protocols" to carry out the challenge-response calculations. The on-card authentication protocols are calculations that generate card responses based on the card key and the received challenge data. In various implementations, card configuration data 312 identifies which type of card is access card 110, and/or identifies which type of authentication protocol(s) can be performed by access card 110.

Card data 314 can include other types of information regarding access card, such as a name of user 115, an identifier of user 115, names or identifiers for the organizations of which user 115 is a member, a card identifier that is unique to access card 110, information regarding access control lists on which the card identifier is listed, information regarding a security clearance of user 115, information regarding which secure facility (or facilities) user 115 is permitted to access, or restrictions that apply to user 115 regarding time, duration, or escort requirements, or other information, or combinations thereof.

Depending on the implementation, some or all of these data 312 and 314 can also be encrypted using TSEK 320. It is also contemplated that additional encryption functions can also be used to generate card credential 330, and that various salt, hash, message authentication codes (MAC), and signature data can be included in card credential 330. In the illustrated example, card credential 330 is generated by using TSEK 320 to encrypt a combination of: card key 310, an expiration date for card key 310, card configuration data 312, and card data 314. As illustrated, these data are locked into card credential 330, protected by TSEK 320.

After generating card credential 330 in this manner, trusted server 130 transmits card credential 330 to card reader 120 over a data network or other communications link. Card reader 120 in turn transmits card credential 330 via wireless link 170 to access card 110. Card key 310 is also transmitted, securely, to access card 110. (It is contemplated that in alternate implementations, a trusted server can initially obtain the card key and/or card data from an access card. In such implementations, it may not be necessary to transmit the card key back to the access card.) Card credential 330 and card key 310 are then stored in memory 370 on access card. Card key 110 is stored in on access card 110 in such a way that it is protected form being readable by a malicious unauthorized user. In this example, enrollment is then complete for access card 110.

Figure 4:
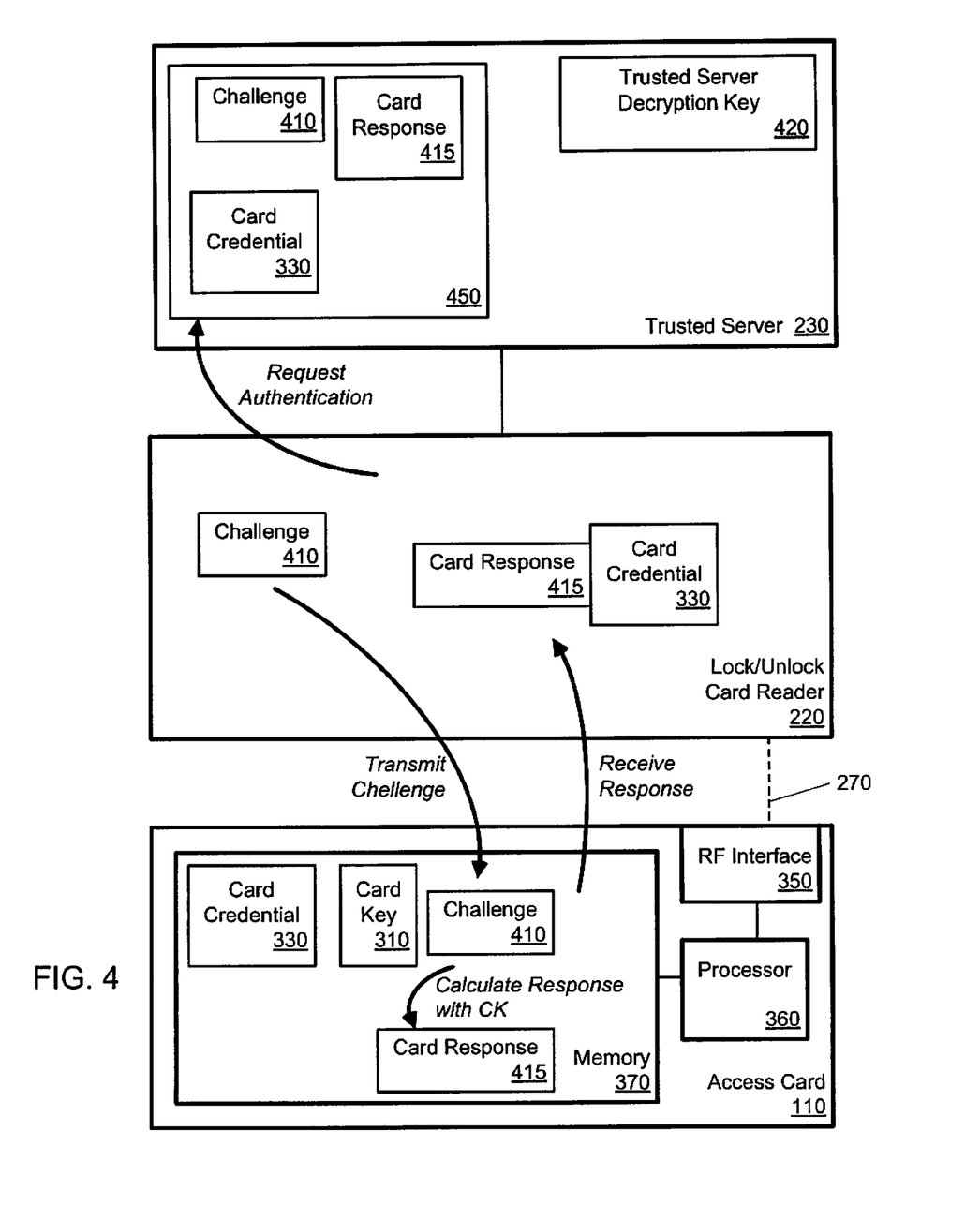
FIG. 4 shows an example of information flow during a first phase of the access request from FIG. 2.

FIG. 4 shows an example of information flow during a first phase of the access request from FIG. 2. This figure shows trusted server 230, card reader 220, and access card 110 from FIG. 2. In this example, access card 110 has completed the enrollment described above with regard to FIG. 1, and is being used to request access to a secure area. Non-contact interface 350 now enables access card 110 to communicate with card reader 220 through wireless link 270. This communication is used for the challenge-response interaction between card reader 220 and access card 110.

In this example, the challenge-response interaction begins after communication has been established between card reader 220 and access card 110. Card reader 220 recognizes that access card 110 has been presented to card reader 110. Card reader 220 then generates a challenge data 410. Alternatively, challenge data 410 can be generated on trusted server 230 and received by card reader 110. Challenge data 410 can consist of or include, for example, a large random number such as a 20-bit, 40-bit, 64-bit, 80-bit, or longer random number. Card reader 110 then transmits challenge data 410 to access card 110 through wireless link 270.

Access card 110 stores challenge data 410 into memory 370. Processor 360 then retrieves card key 310 and challenge data 410 from memory and executes an on-card authentication protocol using both of these data to generate a card response 415. In various implementations, the on-card authentication protocol is a calculation that includes a one-way hashing function. This calculation generates a hash of card key 310 and challenge data 410. The resulting hash is, or is used to generate, card response 415. In other implementations, the on-card authentication protocol involves a calculation that uses challenge data 410, followed by an encryption, signature, or MAC operation with card key 310.

The authentication protocol performed by processor 360 is designed to demonstrate that the access card has possession of the card key. To the extent that possession of the card key indicates that the user of the access card has undergone the enrollment process from FIG. 1, the on-card authentication protocol establishes that the user of the card key has previously undergone the out-of-band authentication process from FIG. 1.

The on-card authentication protocol is designed to execute without compromising the security of the card key. Thus, the on-card authentication protocol can generate the card response in such a way that a malicious party cannot easily determine card keys by analyzing card responses. Various examples of hashing functions are contemplated for use in these calculations, such as Message-Digest Algorithm 5 (MD5), or a Secure Hash Algorithm (SHA-1, SHA-224, SHA-256, SHA-384, or SHA-512), or others. Alternatively, or in addition, various encryption functions are also contemplated for use in these calculations, such as DES, 3DES, AES, Blowfish, Twofish, or ECC.

When selecting an authentication protocol (or protocols) for processor 360, a designer can elect to balance various considerations. For example, high cryptographic security can increase processing overhead for processor 360. At some point, the processing overhead can be unacceptable, especially in implementations where processor 360 is powered by electromagnetic waves received from card reader 220. Such implementations provide convenience to a user: the user can "swipe" the access card by briefly holding or waving (for less than approximately 0.2, 0.5, 1.0, 2.0, or 5.0 seconds, for example) the access card close to (e.g., within a few inches or a few feet) of the card reader. However, these implementations require processor 360 to perform the on-card authentication protocol, and the accompanying communication with the card reader, in a relatively short time, and with relatively little power available. In implementations where an access card is powered by a small on-board battery, the power constraints can be less important, but the short time constraints can still apply. In these and other implementations, power and time constraints can limit the complexity of the on-card authentication protocol. Similarly, these constraints can limit the length of the card key, the length of the challenge data, and/or the length of the card response to the challenge data. In various implementations, designers can avoid using high-overhead algorithms, such as some public-key protocols, in the authentication protocol that is performed by processor 360. Moreover, designers can refrain from processing the card credential 330 in the on-card authentication protocol.

After processor 360 generates card response 415, access card 110 transmits card response 415, along with card credential 330, to card reader 220. Card reader 220 receives these data from access card 110 via wireless link 270. In the illustrated example, card reader 220 does not itself analyze the results of the authentication protocol. Instead, card reader 220 requests authentication of the access card from trusted server 230. Card reader 220 transmits a request for authentication 450, including card credential 330, challenge data 410, and card response 415 through a secure link to trusted server 230. (In some implementations, a card reader can initially obtain challenge data from a trusted server. In these implementations, it is may not be necessary to transmit the challenge data back to the trusted server.) As discussed below, trusted server 230 then uses a trusted server decryption key 420 to examine the data received in request for authentication 450.

Figure 5:
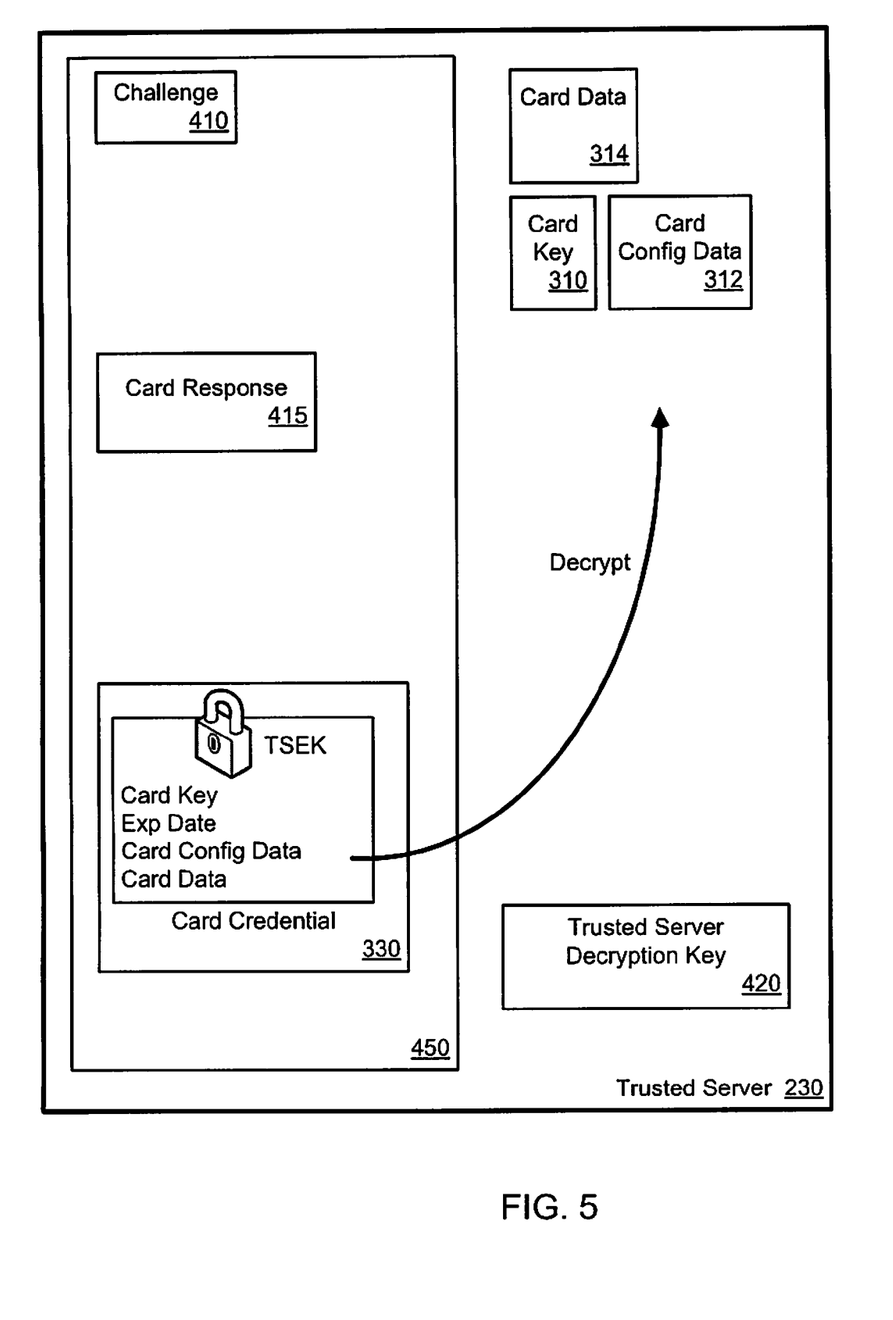
FIG. 5 shows an example of information flow during a second phase of the access request from FIG. 2.

FIG. 5 shows an example of information flow within trusted server 230 during a second phase of the access request from FIG. 2. After receiving request for authentication 450 from card reader 220, trusted server 230 decrypts card credential 330 and determines whether card response 415 is an acceptable response to challenge data 410. The decryption is performed using trusted server decryption key (TSDK) 420. TSDK 420 is a securely protected key that is available to trusted server 230. TSDK 420 is related to TSEK 320, which was discussed above with regard to trusted server 130 in the enrollment environment of FIG. 1. In some implementations, TSDK 420 is a private key from a public-private key pair, and TSEK 320 is the corresponding public key from the public-private key pair. In some implementations, TSDK 420 is a symmetric key, and is the same as TSEK 320. These symmetric-key implementations may offer a streamlined key management in situations where card enrollment is overseen by the same server as card authentication, e.g., where trusted server 230 is the same as trusted server 130.

This decryption with TSDK 420 unlocks the contents that are protected by TSEK 320, and provides trusted server 230 with card key 310, card configuration data 312, and card data 314. In this example, therefore, trusted server 230 does not require advance knowledge of card key 310. Instead, card key 310 is obtained from the unlocking of the card credential that was received in request for authentication 450. This is an example of a "stateless" implementation, where a trusted server can operate without requiring a priori knowledge such as a log of out-of-band authentications and/or information recorded in an access control list. Such implementations may provide various advantages. In this example, a card-authenticating server (e.g., trusted server 230) functions without needing direct communication with an enrolling server (e.g., trusted server 130). Instead, these two servers effectively communicate through information stored on a physical token (e.g., access card 110). In other implementations, the security of the overall system can be augmented by such inter-server communication and/or by the use of access control lists.

The illustrated example applies an encryption and decryption technique that is different from the on-card authentication protocol. In particular, the relevant key (TSDK 420) and decryption calculations for unlocking card credential 330 are different from and independent of the key (card key 310) and challenge-response calculations used by the processor on the access card. Thus, obtaining the card key from the card credential uses an encryption protocol that is independent of the on-card authentication protocol.

Figure 6:
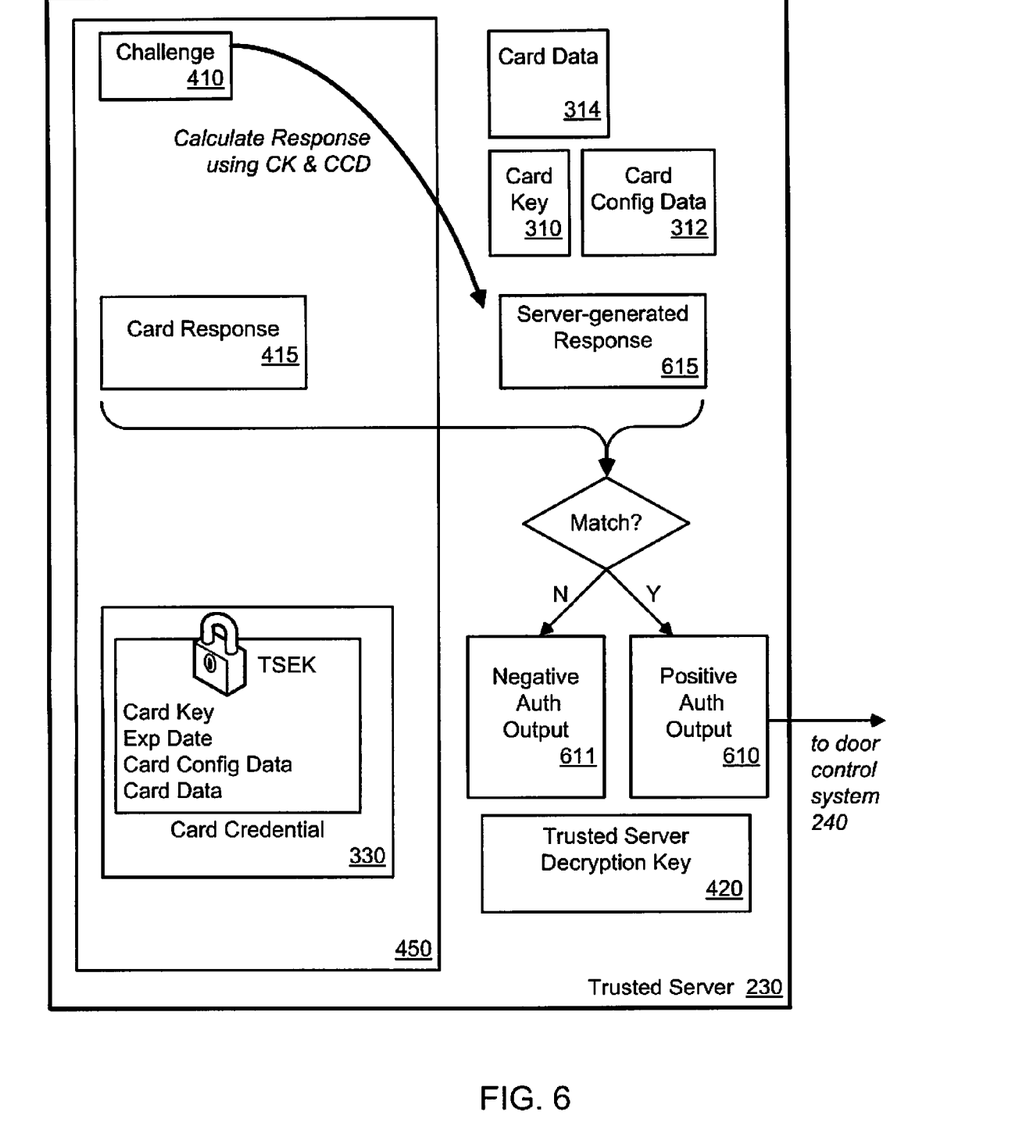
FIG. 6 shows an example of information flow during a third phase of the access request from FIG. 2.

FIG. 6 shows an example of information flow during a third phase of the access request from FIG. 2. After obtaining card key 310 from card credential 330, trusted server 230 locally generates a response 615 using card key 310 and challenge data 410. This server-generated response 615 is therefore based on the same data (card key 310 and challenge data 410) that were used by access card 110 for the on-card authentication protocol. In the context of FIG. 6, the card response 415 received from access card 110 is under scrutiny by trusted server 230. Card response 415 is treated as a "candidate response"—it is evaluated to determine whether it is an appropriate response to challenge data 410.

In one implementation, this evaluation is done by comparing card response 415 to server-generated response 615. If these data do not match, then card response 415 is understood to have been generated by a device that either did have possession of card key 310, and/or was not responding to challenge data 410. Trusted server 230 then generates a negative authentication output 611. Negative authentication output 611 can be provided as an alert to an administrator or an automated security monitoring system, noting that an invalid access request was made. Negative authentication output 611 can be also be provided as feedback to card reader 220 from FIG. 2, which can then flash a red light or emit a tone indicating that access has been denied. Door 250 from FIG. 2 is not unlocked in response to negative authentication output 611.

If instead card response 415 and server-generated response 615 do match, then card response 415 is understood to have been generated by a device that did have possession of card key 310, and which was responding to challenge data 410. Trusted server 230 then generates a positive authentication output 610. Positive authentication output 610 is provided to door controller system 240 from FIG. 2, which then unlocks door 250. User 115 can then gain access to the secure area behind door 250.

In addition to, or instead of, communicating with door controller system 240, trusted server 230 can communicate directly with an electronic lock on the door (e.g., door lock 245), a door controller, a magnetic lock, or other system that directly or indirectly controls access. The communication can be based on positive authentication output 610 or on other analyses of received card credentials and information about challenge-response interactions.

In other embodiments, positive authentication output 610 prompts trusted server 230 to initiate additional security checks before opening door 250. For example, trusted server 230 can first verify that an expiration date obtained from card credential 330 has not been exceeded. As another example, trusted server 230 can use a user identification from card data 314 to consult an access control list (not shown), and confirm that according to the access control list, user 115 is approved for access to door 250.

Figure 7:
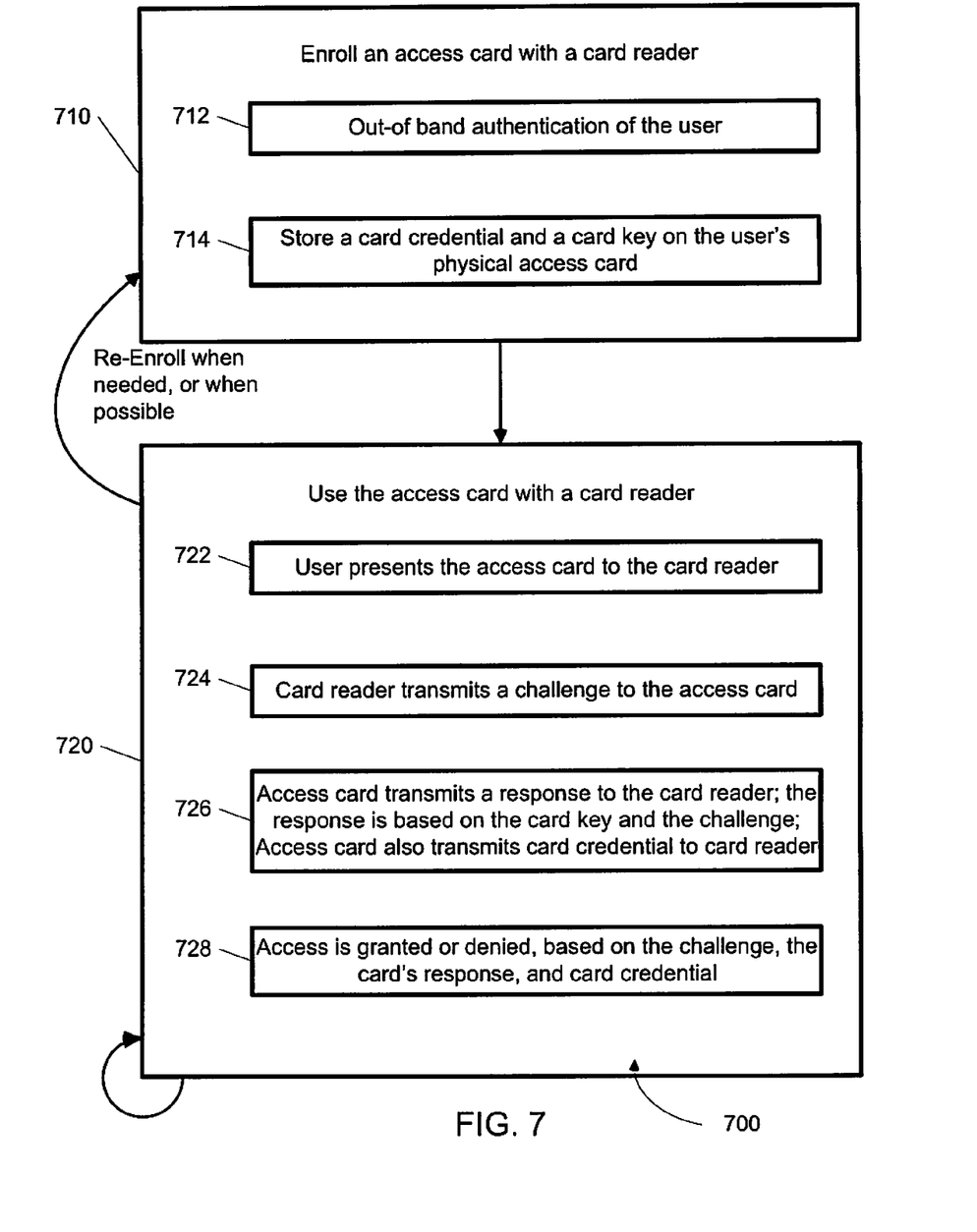
FIG. 7 shows an example of a process used in an access control environment.

FIG. 7 shows an example 700 of a process used in an access control environment. In this example, process 700 includes two sets of operations. An access card is enrolled with a card reader (such as, for example, card reader 120) in act 710, which includes acts 712 and 714. Act 710 can be used, for example, for the operations discussed above with relation to FIG. 1. The access card is then used with a different card reader (such as, for example, card reader 220) to gain access to a secure facility in act 720, which includes acts 722, 724, 726, and 728. Act 720 can be used, for example, for the operations discussed above with relation to FIG. 2.

After an enrollment in act 710, the access card can be used to access a secure facility more than once (e.g., when a user exits the secure facility and later needs to return, or when the user needs to log in again to the same protected computing facilities). The access card can also be used to access additional secure facilities. These repeated access attempts are indicated by a looping arrow in FIG. 7, which causes act 720 to repeat. From time to time (e.g., occasionally or on a set schedule), the access card can be re-enrolled either voluntarily or as required by a security protocol. This re-enrollment is indicated by a looping arrow in FIG. 7 that returns from act 720 to act 710.

It is contemplated that the access card can be a physical access card, and that the secure facility can be a secure area such as one or more offices, office suites, buildings, residences, data centers, or other secure areas, or combinations thereof. It is also contemplated that the access card can be a data access card, such as a login token card, and the secure facility may include secure computing equipment or information, such as secure computer systems or databases. Combinations of physical access and data access are also contemplated, as well as particular applications to financial accounts, secure government facilities, military facilities, corporate facilities, and organizational facilities. In one example, process 700 is used to protect a military research and development laboratory from improper physical access by unauthorized personnel. In another example, process 700 is used with appropriate hardware to protect data on laptops used by humanitarian aid workers from improper access by unauthorized personnel. In yet another example, process 700 is used for access to monetary funds (e.g., on-line purchases or transfers, or withdrawals from automated teller machines) by an account holder at a financial institution.

In various implementations, the interactions between the card reader and the access card in act 710 are contactless interactions. For example, these interactions can use wireless link 170 from FIG. 1. Alternatively, or in conjunction, these interactions can use a contact interface for communication between the card reader and the access card.

Act 710 begins with act 712, in which a user undergoes an out-of-band authentication process. Act 712 is an operation that establishes that a user of the access card is a legitimate user, authorized to gain access to one or more of an organization's secure facilities. In various implementations, act 712 can include a face-to-face interaction between a user and a human gatekeeper of a secure facility (e.g., a facial comparison with a photo identification or other biometric identification of the user, a security interview, and the like), and/or an electronic interaction with an automated gate-keeping circuit or software (e.g., entry of a personal identification number on a keypad at a front security desk, entry of a userid and password or other computer login through a remote login procedure, authentication of a digital certificate or other user credential, and the like). The out-of-band authentication can also include additional checks to review access rights of the user. For example, databases can be used to check an approved set of locations for the user, a security level of the user, a security alert status of the secure area or the organization (high alert, low alert, lockdown, and the like), an access history of user, an access history of the access card, suspected security compromises, relevant administrator instructions, a revision of an access control list, or other factors, or combinations thereof.

In act 714 a card credential and a card key are stored on the access card. In various implementations, the card credential and card key are generated only after the out-of-band authentication process of act 714.

The card credential is generated by a trusted server (such as, for example, trusted server 130). The trusted server used in act 714 can, for example, be remotely located from the card reader in a secure computing center, and connected to the card reader through a secure communications link. Alternatively, the trusted server used in act 714 can be incorporated within the card reader. In one implementation, the trusted server used in act 714 is implemented in a replaceable smart card that is securely mounted within the card reader. The card key can also be generated by the trusted server. The card key and card credential are stored in one or more memories on the access card.

After the enrollment in act 710, the access card can then be used in act 720 to gain access to a secure facility using a card reader. In various implementations, the interaction between the card reader and the access card in act 720 are contactless interactions. For example, these interactions can use wireless link 270 from FIG. 2. Alternatively, or in conjunction, these interactions can use a contact interface for communication between the card reader and the access card.

The card reader used in act 720 is generally deployed at a different location from the card reader used in act 710. In various implementations, the card reader used in act 720 is mounted next to a door or at a security checkpoint that protects a secure area, such as an entry door, an elevator door, a pedestrian gate, an access gate for vehicles, or other doors, to regulate physical movement within an organization, for example.

It is also contemplated that in some implementations, the card reader used in act 720 is the same as the card reader used in act 710. For example, a user may use a card reader for enrollment and then immediately use the same card reader to test the enrollment by requesting access.

As another example, a card reader may serve a double purpose, enabling authentication for cards that it has previously enrolled. Such a double-purpose card reader can be deployed next to an off-site computer, for example. It is contemplated that such a card reader could be plugged into a USB port of a user's home computer or portable computer, or otherwise connected to or integrated into an off-site computer. In this example, the card reader regulates remote access from the off-site computer to computing equipment or to information. Alternatively, or in addition, the card reader regulates access to data that is stored within the off-site computer itself. This card reader is used for enrollment operations (act 710) by requiring entry of an account password or some other out-of-band authorization (e.g., a simultaneous voice telephone call, or entry of a time-varying token code, for example) before granting access to the protected data. This same card reader is again used after some time (act 720) to let the user continue to have access to the protected data, but without having to repeat the out-of-band authorization.

Act 720 begins with act 722, in which a user holds the access card near a card reader, or otherwise presents the access card to the card reader. In one implementation, the card reader continuously broadcasts an RF signal. The access card detects the signal when it is within close range (a few inches to a few feet) of the card reader, and transmits an RF response to inform the card reader of the presence of the access card. In another implementation, the card reader becomes aware of the access card through a change in RF coupling to the surrounding environment, such as an inductive coupling that occurs when the access card is brought within close range. In other implementations, the user presents the card by placing the access card on or in the card reader.

In act 724, the card reader transmits a challenge to the access card. In act 726, the access card returns a response to the card reader. The response is based on the challenge and on the card key that was stored on the access card in act 714. The access card also transmits the card credential to the card reader.

In act 728, the communications between the card reader and access card are evaluated to decide if access should be granted to the secure facility. The evaluation is performed by a trusted server (such as, for example, trusted server 230) that can be different from the trusted server discussed above with regard to act 714. The trusted server used in act 728 can be remotely located from the card reader in a secure computing center, and connected to the card reader through a secure communications link. Alternatively, the trusted server used in act 728 can be contained within the card reader. In one implementation, the trusted server used in act 728 is implemented in a replaceable smart card that is securely mounted within the card reader.

Figure 8:
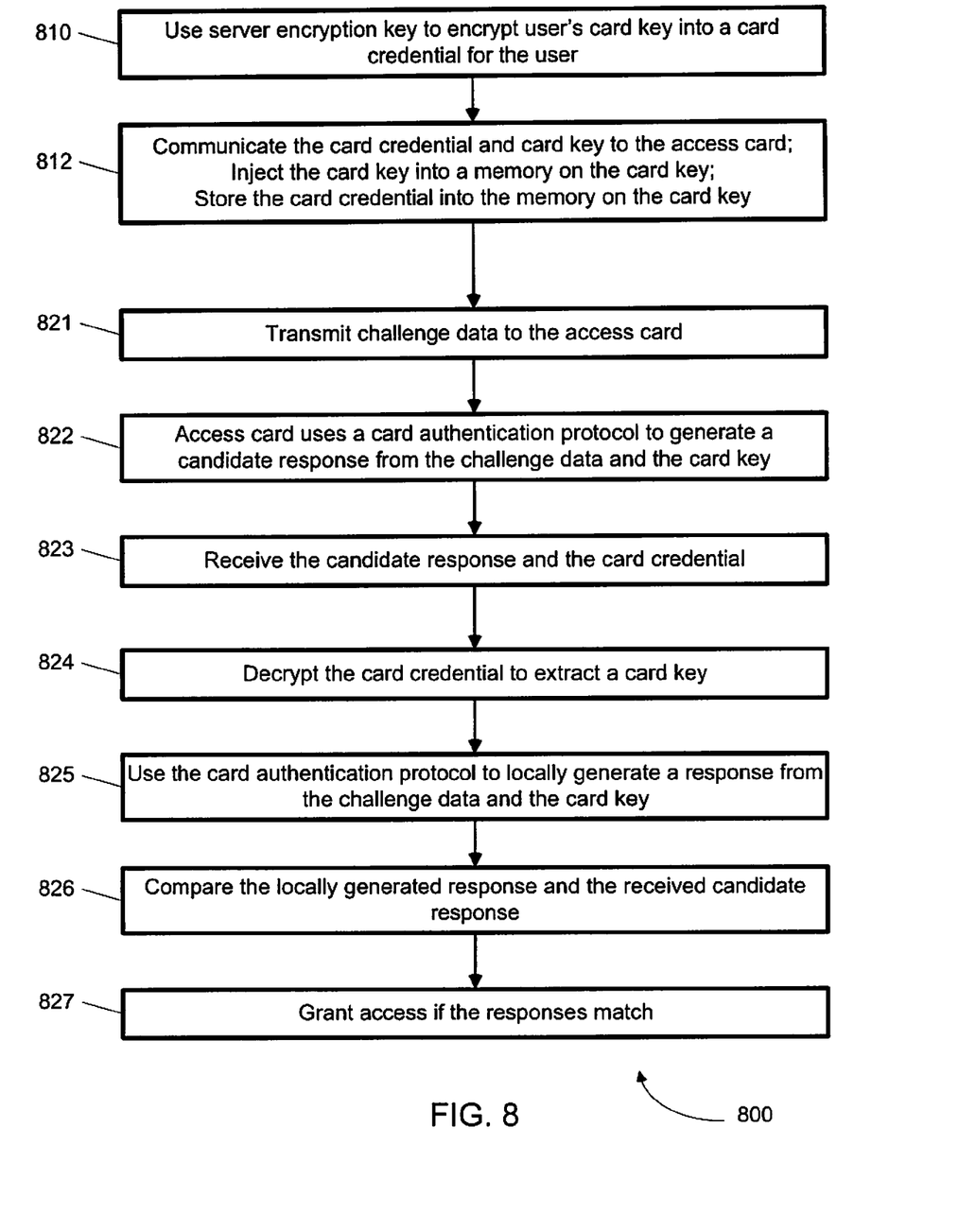
FIG. 8 shows an example of a process with details of some of the operations shown in FIG. 7.

FIG. 8 shows an example 800 of a process with details of some of the operations shown in FIG. 7. In various implementations, acts 810 and 812 can be used in act 714 from FIG. 7 to enroll an access card. Similarly, acts 821, 822, 823, 824, 825, 826, and 827 can be used in acts 724, 726, and 728 from FIG. 7 to authenticate a request for access that was made with the access card. It is noted that various different types of hardware (e.g., access cards, card readers, and servers) and software (e.g., different orderings or combinations of the various acts in processes 700 and 800) are contemplated in addition to the specific examples discussed with respect to FIGS. 7 and 8.

In act 810, a trusted server uses an encryption key, for example TSEK 320 from FIG. 3, to encrypt a card key into a card credential. In various implementations the trusted server can also sign the card credential after (or before) the encryption operation. The card key can also be generated by the trusted server. In act 812, the card credential and card key are communicated to the access card, and are stored in one or more memories on the access card. The card key is stored in on the access card in such a way that it is protected form being readable by an unauthorized user. In various implementations, the card key is injected into a section of memory on the access card (e.g., a key slot) so that the card key is accessible only to a processor on the access card, and the processor is configured not to output or otherwise reveal the raw contents of this section of memory. The card key thus cannot be read from the access card.

In act 821, a challenge is transmitted to the access card. In various implementations, the challenge is (or includes) a unique random number, generated solely for the purpose of challenging the access card on this access attempt. The challenge can be transmitted by a card reader or by a trusted server (via the card reader). In act 822, the access card uses an on-card authentication protocol to generate a candidate response. The candidate response is based on the challenge and on the card key that was stored on the access card in act 812. In act 823, the candidate response is received by a trusted server from the access card. The card credential, from act 812, is also received from the access card.

In act 824, the trusted server uses a decryption key, for example TSDK 420 from FIG. 4, to decrypt the card credential that was received from the access card in act 823. In various implementations the trusted server can precede (or follow) the decryption by authenticating a signature on the card credential. The decryption recovers a card key, which is expected to be the same as a card key that was generated in acts 810 and 822.

In act 825, the trusted server locally generates a response to the challenge that was posed in act 821. To generate this response, the trusted server uses the same on-card authentication protocol that was used in act 822 by the access card. The trusted server can use information extracted form the card credential to determine which of several on-card authentication protocols was used by the access card. The server generates its response based on the challenge and on the card key that was recovered in act 824.

In act 826, the trusted server compares the locally generated response from act 825 to the candidate response that was received in act 823. If and only if these responses match, then the candidate response is understood to have been generated by a device that had possession of the card key and was responding to the challenge data.

In act 827, if the locally generated response fails to match the candidate response, the trusted server denies access. If the locally generated response matches the candidate response, the trusted server initiates a process that can lead to granting access. In various implementations, the subsequent process can include additional checks to review access rights of the user based on data extracted from the card credential (e.g. card data 314) and/or data obtained by the trusted server from databases such as access control lists. For example, the extracted data and/or a positive access control list and/or a negative access control list can be used to check other forms of key life cycle (e.g., "valid-until" time limit, a duration-of-use limit, a number-of-uses limit, a predetermined time mark), an approved set of locations for the user, a security level of the user, a security alert status of the secure area of the organization (high alert, low alert, lockdown, and the like), an access history of the user, an access history of the access card, a suspected security compromise, an administrator instruction, a revision of an access control list, or other factors, or combinations thereof.

FIGS. 1-8 illustrate some of the operational examples of the techniques and tools contemplated for use with access cards. Those having ordinary skill in the art will readily recognize that certain steps or operations described herein can be eliminated or taken in an alternate order, and that various arrangements and alternatives of hardware components can be used.

For example, it is contemplated that the trusted server keys (e.g., TSEK 320 and TSDK 420) can be managed by a public key infrastructure (PKI), which securely manages the distribution of keys among trusted servers and, when necessary, the revocation of keys. It is also contemplated that the trusted server keys can be symmetric keys that are protected by other security procedures and key management protocols. The security of the trusted server keys can be managed and protected with different and separate procedures than the card keys. Thus, in various implementations, a compromise of a card key (e.g., card key 110) does not cause a trusted server key (e.g., TSEK 320 or TSDK 420) to be compromised. If a malicious party were somehow to compromise an access card and read a card key from the access card, this compromise would have a limited effect, providing access only during the life cycle of the compromised card key, and not directly leading to a compromise of a trusted server key.

Moreover, the trusted server keys can have larger key sizes and can use more computationally intensive encryption protocols than the card keys and their on-card authentication protocols. In various implementations, the trusted server keys can have key life cycles that are substantially longer than the life cycles of the card keys. For example, a key lifetime recorded in TSEK 320 or TSDK 420 (e.g., weeks, months, or years) can be substantially longer than a key lifetime recorded in card credential 330 (e.g., hours, days, or weeks). In various implementations, the lifetime for card keys is selected to be something less than an estimated time to compromise a card key, and the lifetime for trusted server keys is selected to be something less than an estimated time to compromise a trusted server key.

The system can also be implemented with revocation mechanisms for card keys or for users. Card-key revocation or user revocation can be implemented, for example, using access control lists. Alternatively, revocation of card keys or users can be done with revocation lists that are more concise than access control lists. Various offline or out-of-band checks can also be done to screen for compromised or revoked users, access cards, card keys, or card identifiers. In various implementations, revocations and other responses to the compromise of a card key can be implemented without invoking higher-level responses that would be needed in response to the compromise of a trusted server key.

It is also contemplated that access control lists can be used to augment the authentication procedures described above. For example, a system can use an access control list to retrieve additional information regarding a user, such as permissions or restrictions previously established for the user. The information retrieved from an access control list can be used in conjunction with information that is retrieved by the decryption of a card credential (such as information in FIG. 5 from card data 314 and/or card configuration data 312, for example). For example, a card identifier can be stored in card data 314, and an access control list can be used to confirm that the user's access card matches a card identifier that was previously stored in an access control list (e.g., during or before an enrollment procedure such as act 710). Alternatively, various implementations can avoid the use of access control lists altogether; these implementations may extract all relevant permissions and restrictions for a user from the card credential. Such implementations enable stateless security systems that can authenticate access cards without needing to consult access control lists.

By avoiding a reliance on access control lists, designers may facilitate inter-organization authentication. In one example, a user undergoes an out-of-band authentication and enrollment (discussed above with regard to FIG. 1) at a first organization in the morning of a particular day. This authentication provides the user with a credential that expires at the end of that day. The user can then use the access card to enter secure areas (discussed above with regard to FIG. 1) at the first organization throughout the morning. In the afternoon of the same day the user needs to access secure areas within a second organization. The second organization is different from the first organization, but cooperates with the first organization. In this example, the second organization shares static information such as decryption keys (e.g. TSDK 420) with the first organization, but does not share continually updated information such as access control lists. When the user requests entry to a secure area in the second organization, a trusted server in the second organization can respond to the request (similar to the situation described above with regard to FIG. 2). In this example, the trusted server at the second organization compares a candidate response to a server-generated response (e.g., act 826), but does not need any additional confirmation of the candidate response or the underlying card key from an access control list.

Such an implementation can be useful, for example, in situations where one organization performs enrollment operations and a second, different, organization relies on those enrollments. The second organization can rely on (a) the integrity of its decryption key and (b) the successful matching of the candidate response to the locally generated response to verify that the access attempt is being made with an access card that has successfully undergone enrollment. The second organization can use additional information in the decrypted card credential, for example to confirm that the successful enrollment was recent.

Hybrid reliance on access control lists is also contemplated. Continuing the above example, the second organization can consult an internal access control list for purposes other than authenticating the user or the user's access card. For example, the second organization's internal access control list can indicate which of several secure areas within the second organization can be accessed by this user.

Moreover, it is contemplated that a third organization can cooperate with the first organization, but is not willing to share trusted server keys with the first organization. The third organization can, however, cooperate so that users can employ a single access card for both the first and third organizations. The third organization can be a bank (or other financial institution) that uses a separate set of trusted server keys, which are used to enroll access cards with corresponding card credentials that allow the users to withdraw or otherwise use money on deposit (or on credit) at the bank. The bank can require the user to undergo an out-of-band authentication, in person or on-line, to demonstrate that the user indeed holds an account at the bank. For a limited time thereafter (e.g., hours or days, or perhaps weeks if the user informs the bank that she will be travelling on vacation), the user can use the access card to withdraw funds from a conforming automated teller machine (ATM) or use a portable card reader to direct transfers of funds from the account or authorize purchases with funds from the account.

In the above example, one access card is configured to store two card credentials and two card keys: one card key and card credential are for the first and second organizations, and the other card key and card credential are for the third organization. In other environments, the access card can be configured to store simultaneously three (or more) different card credentials, for three or four (or more) different organizations.

It is also contemplated that a single trusted server can be used with a variety of types of access cards. For example, an organization can have deployed three different types of access cards, which perform three different types of on-card authentication protocols. The card credential stored on an access card can indicate which type of on-card authentication protocol is performed by that access card. This information can be recorded, for example, in card configuration data 312. When the trusted server decrypts the card credential, it uses this information to decide which on-card authentication protocol should be used to locally generate the server response (e.g. response 615).

This flexibility with regard to different types of access cards can be useful to system designers when performing an incremental (user-by-user, or area-by-area) upgrade of a security system. Depending on the implementation, the different types of access cards may or may not require different types of card readers.

It is also contemplated that the tools and techniques described above can be added incrementally, on an area-by-area basis, to an organization that has an existing legacy access control system. The legacy system may use legacy card readers and a large number of existing legacy access cards issued to existing users. One or more of the areas can then be upgraded to use the techniques described above. In one example, a limited number of personnel who need to access the upgraded areas can be given access cards (such as access card 110, for example) that require an out-of-band authentication and can carry a card credential such as described above. Other users can continue to use the legacy access cards. The card readers for the upgraded area can then be connected to a trusted server (such as trusted server 230) that can decrypt the card credentials. This trusted server can then transmit authentication outputs to the legacy access control system, which is connected with a legacy door controller system. Depending on the implementation, the card readers for the higher-security areas may need to be upgraded (or replaced), but this upgrade can be carried out on an area-by area basis, without disrupting the entire security operations at one time.

In one example, the legacy card readers transmit card identifiers as the output to authentication requests. The card identifiers are unique identifiers that conform to a format for the legacy system. The legacy card readers transmit this output to the legacy access control system. The legacy access control system checks a received card identifier against an access control list to determine whether or not to open a door. This type of legacy system can be upgraded, one secure area at a time, by deploying a trusted server (such as trusted server 230) between the upgraded secure areas and the legacy access control system. When a user requests access to a non-upgraded area, the legacy system operates normally. When a user requests access to an upgraded area, the trusted server performs operations (such as acts 823-826) to determine whether the user's access card is responding appropriately to challenge data with a card key. If the internal comparison successfully authenticates an access request, the trusted server uses a card identifier (received, for example, from card data 314) as an output that is passed on to the legacy access control system for further comparison to the access control list. However, if the internal comparison fails to authenticates an access request, the trusted server does not generate an authentication output, and the legacy access control system is not prompted to consider the access request.

It is also contemplated that various implementations can provide convenience to a user by occasionally re-enrolling the user's access card during an access request. For example, in one example a user completes an enrollment by undergoing an out-of-band authentication in the morning of a working day (e.g., by interacting with a front-desk security guard or by logging in from a home computer). The enrollment stores a card credential onto the user's access card, with a life time of 8 hours noted in the card credential. Over the next six hours, the user behaves in a manner that is in accordance with standard security procedures (e.g., by attempting to access only permitted areas in a building, or by re-logging every two hours using a card reader at home). No security alerts are posted over the next six hours. In view of these nominal operations, the security system may renew the enrollment of the user by automatically replacing the card credential on the user's access card with a renewal card credential, whenever the user presents the access card to a card reader. This new card credential can include, for example, a life time of an additional 4 hours beyond the originally noted life time.

Conversely, it is contemplated that an enrollment may be withdrawn in response to an abnormal behavior of a user, or in response to a security policy not being met. Continuing the above example, if the security system is compromised, or if the user does something that is not approved by standard security procedures, then the next time the user presents the access card to a card reader, the card credential on the access card can be deleted, amended with a cancelation notice, or otherwise revoked. The security policy could be deemed as not being met due to, for example, the detection of an intruder, a report of questionable activity, a passage of a predetermined time interval, a passage of a predetermined time mark, an excessive number of access attempts, a suspected security compromise, a user instruction for alert, a revision of an access control list, the user attempting access to a forbidden area or to forbidden data, or the entering an correct PIN code or password, among others.

After a user's card credential has been revoked, the user can be required to undergo an in-person re-enrollment. The re-enrollment can provide confirmation of the validity of the user, and possibly a review of the security clearance of the user.

Similarly, it is contemplated that card credentials can be withdrawn in response to a security alert. The withdrawal can be organization-wide, or can be limited to credentials for a particular area(s) or a particular user(s). The withdrawal would be performed the next time that the access card is presented to a card reader, for example, the next time the user attempts to enter a secure area. Such a withdrawal can involve the consultation of an access control list or a revocation list, and can involve the examination of restrictions included in a card credential.

Moreover, various operations discussed with respect to FIGS. 1-8 can be implemented as one or more software programs (or modules) for one or more processors. Those having ordinary skill in the art will readily recognize that various operations and calculations discussed above can be implemented using software in a variety of computer languages, including, for example, traditional computer languages such as assembly language, Pascal, and C; object oriented languages such as C++, C#, and Java; and scripting languages such as Perl and Tcl/Tk. Similarly, various operations can be implemented as hardware modules such as application-specific integrated circuits (ASICs), microcontrollers, or other appropriate circuits.

The software can be encoded on a computer readable storage medium as instructions executable on one or more processors, for example on various servers, card readers, or smart cards, or combinations thereof. The computer readable storage medium can include a non-volatile or volatile solid-state storage medium (e.g., flash memory, dynamic random access memory, and the like), a magnetic storage medium (e.g., hard disk, a floppy disk, and the like), or an optical storage medium (e.g., CD-ROM, CD-R, CD-RW, DVD-ROM, and the like), or combinations thereof. Alternatively, or in addition, the software programs can also be provided to a system using a communications medium, such as a transmission line or electromagnetic wave, conveying signals encoding the instructions. Separate instances of the programs can be executed on separate computer systems. Thus, although certain steps have been described as being performed by certain devices, software programs, processes, or entities, this need not be the case and a variety of alternative implementations will be understood by those having ordinary skill in the art. Additionally, those having ordinary skill in the art will readily recognize that the techniques described above can be utilized with a variety of different smart cards and computing systems with variations in, for example, the number and type of smart cards, communications interfaces, servers, and card readers.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving a request for authentication, wherein the request for authentication comprises a card credential and a candidate response;
   decrypting, using a processor, at least a portion of the card credential using a server decryption key to recover a card key;
   generating a response data based on at least the card key, a challenge data that was provided to an access card during a challenge-response interaction, and a card authentication protocol, wherein the card credential was transmitted from the access card;
   comparing the candidate response to the response data; and
   generating an authentication output based at least on the comparing.

2. The method of claim 1, wherein the generating the authentication output comprises:
   generating a positive output only if
      the candidate response matches the response data, and
      a key lifecycle data decrypted from the card credential indicates that the card key is not obsolete; and
   generating a negative output if the candidate response does not match the response data.

3. The method of claim 1, wherein:
   the card credential is generated by a server computer as part of an enrollment procedure following an authentication of a user of the access card; and
   the receiving the request for authentication is performed by the server computer following an access request by the user.

4. The method of claim 1, wherein the card credential is generated by a first server computer, and the receiving the request for authentication is performed by a second server computer that is different from the first server computer.

5. The method of claim 1, wherein the generating the authentication output comprises:
   generating a positive output only if
      the candidate response matches the response data, and
      a key lifecycle data decrypted from the card credential indicates that the card key is not obsolete; and
   generating a negative output if the candidate response does not match the response data.

6. The method of claim 1, wherein the card authentication protocol is selected from a plurality of card authentication protocols based on information obtained from the card credential.

7. The method of claim 1, wherein:
   the access card is configured to execute the card authentication protocol;
   the card authentication protocol is substantially less computationally intensive than the decrypting; and
   the access card is incapable of obtaining the card key from the card credential.

8. The method of claim 1, wherein the decrypting uses a public key cryptographic protocol, and the card authentication protocol uses a symmetric key.

9. The method of claim 1, further comprising:
   transmitting the challenge data to the access card; and
   generating the candidate response using at least the card key, the challenge data, and the card authentication protocol, wherein the generating the candidate response is performed by the access card.

10. The method of claim 9, wherein the transmitting the challenge data to the access card is performed by a card reader, the request for authentication is received from the card reader, and the request for authentication further comprises the challenge data.

11. The method of claim 10, further comprising:
    transmitting the card credential from the access card to the card reader through a contactless communications link between the access card and the card reader;
    transmitting the candidate response from the access card to the card reader through the contactless communications link; and
    generating the request for authentication, wherein the generating the request for authentication is performed by the card reader in response to receiving the candidate response from the access card.

12. The method of claim 1, further comprising:
    obsoleting the card key based on a first key life cycle; and
    obsoleting the server decryption key based on a second key life cycle that is substantially longer than the first key life cycle.

13. The method of claim 1, further comprising:
    authenticating a user of the access card; and
    transmitting the card credential to the access card, in response to the authenticating the user.

14. The method of claim 13, wherein the authenticating the user comprises one or more of:
    manually checking a photographic identity card of the user;

the user successfully completing a computer login; or the user demonstrating authorization to use a financial account.

15. The method of claim 13, further comprising:

replacing the card credential on the access card with a renewal card credential in response to one or more of a security policy being met for a period of time, a successful user login event, or a re-authentication of the user; and in response to the security policy not being met, one or more of re-authenticating the user, or revoking the card credential.

16. The method of claim 1, further comprising:

incorporating a card identifier into the card credential, wherein the card identifier is usable with a legacy access system, and the generating the authentication output comprises retrieving the card identifier from the card credential, and transmitting the card identifier to the legacy access system.

17. The method of claim 1, further comprising:

generating a second card credential, wherein the generating the second card credential comprises encrypting a second card key using a second server encryption key that is different from the server encryption key; and transmitting the second card credential to the access card.

18. A system comprising:

a data interface;

a memory; and a processor coupled to the data interface and the memory, and configured to receive a request for authentication through the data interface, wherein the request for authentication comprises a card credential and a candidate response, decrypt at least a portion of the card credential using a decryption key to recover a card key, generate a response data based on at least the card key, a challenge data that was provided to an access card during a challenge-response interaction, and a card authentication protocol, wherein the card credential was transmitted from the access card, and generate an authentication output based at least on a comparison of the candidate response and the response data.

19. The system of claim 18, wherein the processor is further configured to select the card authentication protocol from a plurality of card authentication protocols based on information obtained from the card credential.

20. The system of claim 18, wherein:

the processor is configured to use a decryption protocol to obtain the card key from the card credential;

the card authentication protocol is performed by the access card and is substantially less computationally intensive than the decryption protocol;

the access card is incapable of obtaining the card key from the card credential;

the card key is a symmetric key;

the decryption key is an asymmetric key;

the processor is configured to obsolete the card key based on a first key life cycle; and the processor is configured to obsolete the decryption key based on a second key life cycle that is substantially longer than the first key life cycle.

21. A system comprising:

means for receiving a request for authentication, wherein the request for authentication comprises a card credential and a candidate response;

means for decrypting at least a portion of the card credential using a server decryption key to recover a card key;

means for generating a response data based on at least the card key, a challenge data that was provided to an access card during a challenge-response interaction, and a card authentication protocol, wherein the card credential was transmitted from the access card; and means for generating an authentication output based at least on a comparison of the candidate response and the response data.

22. A non-transient computer-readable medium encoded with instructions executable by one or more processors to perform acts comprising:

receiving a request for authentication, wherein the request for authentication comprises a card credential and a candidate response;

decrypting at least a portion of the card credential using a server decryption key to recover a card key;

generating a response data based on at least the card key, a challenge data that was provided to an access card during a challenge-response interaction, and a card authentication protocol, wherein the card credential was transmitted from the access card;

comparing the candidate response to the response data; and generating an authentication output based at least on the comparing.

23. The non-transient computer-readable medium of claim 22, wherein:

the card credential is generated by a server computer as part of an enrollment procedure following an authentication of a user of the access card; and the receiving the request for authentication is performed by the server computer following an access request by the user.

24. The non-transient computer-readable medium of claim 22, wherein the generating the authentication output comprises:

generating a positive output only if the candidate response matches the response data, and a key lifecycle data decrypted from the card credential indicates that the card key is not obsolete; and generating a negative output if the candidate response does not match the response data.

25. The non-transient computer-readable medium of claim 22, wherein:

the card authentication protocol is selected from a plurality of card authentication protocols based on information obtained from the card credential;

the decrypting uses a public key cryptographic protocol; and the card authentication protocol uses a symmetric key cryptographic protocol.

26. The non-transient computer-readable medium of claim 22, wherein:

the access card is configured to execute the card authentication protocol;

the card authentication protocol is substantially less computationally intensive than the decrypting; and the access card is incapable of obtaining the card key from the card credential.

27. The non-transient computer-readable medium of claim 22, wherein the request for authentication is received from a card reader, the request for authentication further comprises the challenge data, and the instructions are executable to perform acts comprising:

transmitting the challenge data from the card reader to the access card through a contactless communications link between the access card and the card reader;

generating the candidate response using at least the card key, the challenge data, and the card authentication protocol, wherein the generating the candidate response is performed by the access card;

transmitting the card credential from the access card to the card reader through the contactless communications link;

transmitting the candidate response from the access card to the card reader through the contactless communications link; and     generating the request for authentication, wherein the generating the request for authentication is performed by the card reader in response to receiving the candidate response from the access card.

28. The non-transient computer-readable medium of claim 22, wherein the instructions are executable to perform acts comprising:

obsoleting the card key based on a first key life cycle; and     obsoleting the server decryption key based on a second key life cycle that is substantially longer than the first key life cycle.

29. The non-transient computer-readable medium of claim 22, wherein the instructions are executable to perform acts comprising:

authenticating a user of the access card;

transmitting the card credential to the access card, in response to the authenticating the user;

replacing the card credential on the access card with a renewal card credential in response to one or more of         a security policy being met for a period of time,         a successful user login event, or         a re-authentication of the user; and     in response to the security policy not being met, one or more of         re-authenticating the user, or         revoking the card credential.

30. The non-transient computer-readable medium of claim 22, wherein the instructions are executable to perform acts comprising:

retrieving, from the card credential, a card identifier usable with a legacy access system; and     transmitting the card identifier to the legacy access system.

\* \* \* \* \*